Patented Dec. 23, 1952

2,623,057

UNITED STATES PATENT OFFICE 2,623,057

HYDROCARBON SYNTHESIS

John H. Arnold, Summit, N. J., assignor to Hydrocarbon Research, Inc., New York, N. Y., a corporation of New Jersey No Drawing. Application April 20, 1948,
Serial No. 22,266

3 Claims. (Cl. 260—449.6)

The present invention relates to the catalytic synthesis of hydrocarbons, oxygenated hydrocarbons and the like, and more particularly concerns controlling the conversion of synthesis gas into high yields of desired liquid products by regulating the extent of carbon dioxide formation.

More specifically, the invention contemplates maximum utilization of synthesis gas in the formation of liquid hydrocarbons under conditions of continuing catalyst effectiveness, particularly as regards minimizing the formation of solid carbon or carbonaceous materials which shorten catalyst life and impair yields. It particularly contemplates controlling operation to such end on the basis of net by-product carbon dioxide formation encountered as reflected by the net yield thereof appearing in the final tail gas of the process.

The present invention involves contacting a synthesis gas with a solid particle hydrocarbon synthesis catalyst at elevated operating temperature and pressure, while correlating the net yield of by-product carbon dioxide thus formed with the relative molar proportion of hydrogen and carbon monoxide in the fresh or net synthesis gas feed to the process, and the relative liquid hydrocarbon yield, basis total hydrocarbon yield. More specifically, it has been discovered that the yield of desired liquid products, as well as minimization of catalyst carbonization, bears an empirical relationship to the formation of carbon dioxide in the process which is affected primarily by the relative molar proportions in which hydrogen and carbon monoxide are supplied to the system, and the approximate relative proportion of atomic hydrogen and carbon in the synthesis product. It follows, therefore, that controlled improvement in yield and restraint of undesired catalyst contamination may be realized by adjustment of the net yield of carbon dioxide in accordance with the relative proportions of hydrogen and carbon in the fresh reactant feed stock employed and the character of the hydrocarbons yielded.

In accordance with the invention, I have found that such control may be predicated upon an empirical correlation between the optimum net yield of carbon dioxide, expressed as percentage of carbon monoxide consumed, and designated by the symbol "K"; the molar ratio of hydrogen to carbon monoxide in the net or fresh feed to the process, designated by the symbol "R"; and the percentage relationship which the net yield hydrocarbons containing three or more carbon atoms, plus all oxygenated hydrocarbons produced, bears to the total hydrocarbons and oxygenated hydrocarbons produced, basis carbon monoxide consumed by reaction in the process, herein designated by the symbol "S." The correlation may be expressed by the following equation:

$$K = 91 - 33R - 0.2S$$

In brief, the present invention involves adjustment of by-product carbon dioxide formation to a value about or approximating that determined by the symbol "K" of the foregoing equation for high yield of liquid product and low yield of carbon. Either above or below this range, reaction conditions are ineffective to convert maximum available carbon to hydrocarbons without increased production of gaseous hydrocarbons, and moreover, below this range of carbon dioxide production, catalyst carbonization tends to become excessive.

Control and maintenance of the carbon dioxide yield within the indicated range may be effected in a number of ways, which per se form no part of the present invention. Presumably, carbon dioxide production results primarily from the incidence of the water-gas shift reaction:

$$CO + H_2O = CO_2 + H_2$$

which prevails in varying degree in the synthesis of hydrocarbons depending on such factors as the catalyst employed and the conditions of reaction. Typical iron type catalysts, under usual superatmospheric pressure and temperatures in the range of 550 to 750° F. usually result in a close approach to the equilibrium characterizing this reaction. Some variation may be experienced with the specific catalyst selected, however, and with other hydrocarbon synthesis catalysts, such as cobalt and nickel, the effect may be much less pronounced.

Therefore, the extent of carbon dioxide production is controllable to some extent by catalyst selection.

Other controls, usually more suitable for practical operation involve adjustment of the recycle ratio, catalyst bed temperature, and the extent of conversion of the carbon monoxide feed. In general, increase in any of these factors lowers net carbon dioxide formation while a decrease has the opposite effect. For example, as the carbon monoxide supplied closely approaches complete conversion, the carbon dioxide yield decreases. Therefore, variation in contact time or any other condition which alters degree of conversion is useful.

Supplementing the total reactor feed with carbon dioxide similarly tends to suppress net formation thereof, whereas inclusion of small amounts of water vapor tends in the opposite direction. Reference is had to the copending applications, Serial No. 721,538, filed January 11, 1947, and Serial No. 760,498, filed July 11, 1947, for exemplary methods of predetermining the extent of carbon dioxide formation by controlling the relative proportions of hydrogen, carbon monoxide, carbon dioxide and water vapor in the total mixture of materials contacting the catalyst.

The present invention is of particular advantage in affording a simple, practical method for continuously maximizing yield, both on a current as well as on an over-all catalyst basis, in response to operating data regarding feed stock and product composition and character such as is conventionally observed, and is thus currently available to the operator.

While it has been proposed earlier to limit the production of carbon dioxide in order to conserve carbon as a critical feed material for the process, nevertheless such proposals have tended to overlook the fact that controlled diversion of carbon dioxide may frequently be essential to maximum formation of desired liquid product. Actually, the available hydrogen and carbon in the synthesis gas met with in normal operation seldom balance the stoichiometrical requirements of the over-all hydrocarbons and oxygenated hydrocarbons produced, nor do they meet the special reactant relationships which must be maintained in the reaction zone for good operation.

For example, in conventional operation, the proportion of molecular hydrogen to carbon in the synthesis gas is limited by the character of the hydrocarbonaceous raw material used in its manufacture. Of the various raw materials which might be used for the production of synthesis gas, natural gas, which is generally predominantly methane, has the most favorable hydrogen to carbon ratio, i. e., $2H_2/1C$. With a raw feed of this type, a synthesis gas containing approximately two mols of $H_2$ to one mol of CO, may be prepared. Increasing the $H_2/CO$ ratio of this synthesis gas can be effected only by external hydrogen supplementation or extensive processing, both of which are frequently uneconomical. With a synthesis gas containing two mols of $H_2$ and one mol of CO, the idealized synthesis reaction may be written as follows:

$$2H_2 + CO = (CH_2) + H_2O$$

In the actual operation of a synthesis reactor, however, the over-all atomic H/C ratio of a typical hydrocarbon product produced under conditions where S is 80, is usually in the neighborhood of about 2.4:1. This being the case, it is obvious that the foregoing idealized reaction cannot be conducted without the production of some $CO_2$ and a theoretical balanced equation for this reaction may be written as follows:

$$2H_2 + CO = 0.9375 CH_{2.4} + 0.875 H_2O + 0.0625 CO_2$$

From the foregoing, it is obvious that some $CO_2$ must be produced in the synthesis reaction to satisfy the stoichiometric requirements. If the synthesis gas feed is even more hydrogen-deficient than is indicated above, such as would be the case if the synthesis gas were prepared from a heavy oil or solid carbonaceous material such as coal or lignite, even larger quantities of $CO_2$ would have to be produced in order to satisfy the stoichiometric balance. In addition to the effect of synthesis gas H/C ratio on the required $CO_2$ production, the H/C ratio of the hydrocarbons produced in the synthesis reaction influences the required $CO_2$ yield.

Moreover, a substantial concentration of hydrogen in the reactor effluent, for example, about 25 to 35 per cent, is necessary to prevent rapid catalyst carbonization. Obviously, a deficiency of hydrogen is made up essentially by the effect of the water-gas shift reaction, and is reflected by the net carbon dioxide produced. However, the liquid product yield decreases with excessively increased hydrogen concentration in the reactor. The present invention obviates these difficulties by controlling the extent of carbon dioxide formation.

In order to more clearly illustrate the invention, a dense phase fluid mass of solid particle, hydrocarbon synthesis catalyst is disposed in a reaction zone and subjected to upflow of a fresh synthesis gas at an elevated temperature and pressure at which the selected catalyst is effective to directly convert hydrogen and carbon monoxide into desired liquid hydrocarbons.

The linear rate at which the gas flows upwardly may be adjusted to a rate at which the catalyst particles are maintained in the desired dense phase condition. Alternatively, mechanical agitating means may be employed. Temperature control may be effected in any conventional manner, preferably by disposing suitable cooling surfaces within the catalyst. The products of reaction, after substantial conversion of carbon monoxide, are withdrawn from contact with the catalyst, cooled to condense liquid products including by-product water vapor and hydrocarbons, and separated gases continuously recirculated to the reaction zone at any suitable recycle ratio, the residue of the separated gases being discarded as final tail gas.

In the course of continuous operation, the actual net production of carbon dioxide on the basis of the carbon monoxide consumed is established by the yield and composition of the final tail gas. Similarly, the yield of oily liquid taken together with the hydrocarbon gases present in the aforesaid tail gas and the oxygenated compounds in the aqueous condensate reflect the per cent net yield of hydrocarbons containing three or more carbon atoms, plus all oxygenated hydrocarbons, basis the total net hydrocarbons and oxygenated hydrocarbons produced. This factor corresponds to and establishes the value of the symbol S, herein known and referred to as "Selectivity."

Since the value of R is equal to the molar ratio of hydrogen to carbon monoxide in the fresh feed synthesis gas, the desired carbon dioxide yield (K) is immediately determinable in accordance with the foregoing equation.

Thereafter, the actual yield of carbon dioxide is adjusted by alteration of recycle ratio, operating temperature and/or any of the other steps discussed above to correspond with the calculated value of K.

It is to be understood that while the selectivity S is primarily a function of the catalyst and catalyst condition, it may vary somewhat in accordance with conditions of operation and thus is susceptible to some variation during the readjustment of carbon dioxide yield. Therefore, it may frequently be necessary to make several successive adjustments in order to ultimately arrive at an appropriate adjustment of the variables so that the selectivity and carbon dioxide yield simultaneously satisfy the above equation.

While the invention broadly contemplates operation with any of the usual hydrocarbon synthesis catalysts, containing metals of the iron group and ruthenium, it is, as intimated above, particularly applicable to the use of iron type catalysts, such, for example, as reduced and conditioned iron powder, or catalysts of the supported type, wherein an iron salt is precipitated on a suitable carrier such as silica gel, fuller's earth and the like, and is thereafter reduced and conditioned by treatment with synthesis gas. The catalyst may include the usual activators and promoters such as the alkali or alkaline earth metal oxides, titania, thoria and the like.

While reference has been specifically made to recycle operation, the invention has surprising general applicability to single pass or staged operation, or any other of the methods of catalytic hydrocarbon synthesis, wherein a fresh feed comprising essentially hydrogen and carbon monoxide is converted and the net products continuously withdrawn from the system. Such, for example, include separation and preferential return of desired gaseous products, such as product carbon dioxide, to the reaction zone. Thus, as indicated above, observation of the principles of the present invention in each case tends inherently to result in a maintenance of the proper relative proportion of reactants in the reaction zone consistent with maximum conversion of the available carbon monoxide into desired products.

It is to be noted that the foregoing equation is applicable to operations employing synthesis gas feeds of the character normally met with in practice, that is to say, feed gases having relative molar proportions of hydrogen to carbon monoxide varying from about 0.8:1 to 2.2:1.

Reaction temperatures for the broad class of catalysts vary usually between 350 and about 700° F., although as indicated above, in the case of iron containing catalysts, reaction temperatures are usually in the range of from about 500–750° F., preferably 600–650° F., and in this case, operating pressures are usually above atmospheric, as for example, in the range of from about 50 to 450 p. s. i. g.

As previously intimated, the invention contemplates substantial conversion of feed carbon monoxide, as between the net feed of reactants and the final tail gas, by which is meant at least 90 per cent and preferably in excess of 95 per cent conversion of the carbon monoxide supplied. Conversion to the extent of 98 per cent and over 99 per cent is usually feasible and in this range and beyond, any minor increase usually results in appreciable decrease in carbon dioxide yield.

In order to substantiate and exemplify the present invention, reference is had to the following test runs carried out at pressures about 200 p. s. i. g., and temperatures of 600–650° F., in the presence of typical iron type catalyst, comprising reduced iron oxide conditioned by operation and containing the usual modifying agents. The conditions of operation including the molar ratio of hydrogen to carbon monoxide (R), the net yield of carbon dioxide and the selectivity (S), as well as the final yield of hydrocarbons, including $C_3$ and above, as well as the rate of carbon formation, are given in the following table:

|  | R | S | K | Percent Actual $CO_2$ Yield | Percent Yield of $C_3$+ Hydrocarbons | Percent Yield of Carbon |
|---|---|---|---|---|---|---|
| Run 1 | 1.9 | 88.0 | 10.7 | 7.0 | 81 | 1.16 |
| Run 2 | 1.9 | 91.0 | 10.1 | 11.0 | 81 | 0.20 |
| Run 3 | 2.1 | 60.0 | 9.7 | 30.0 | 42 | 0.30 |
| Run 4 | 1.2 | 67.3 | 37.9 | 40.1 | 40.3 | 0.17 |
| Run 5 | 0.76 | 74.7 | 51.0 | 48.0 | 38.9 | 0.32 |

Run 1 of the table is an illustration of relatively poor operation as regards catalysts carbonization. Although the selectivity, S, and the yield of $C_3$+hydrocarbons is good, the actual yield of $CO_2$ is less than that required in accordance with my invention. Because of this fact, the carbon yield is high and, because the carbon produced is deposited on the catalyst, causing the catalyst to agglomerate and become inactive, synthesis operations could not be sustained for any reasonable length of time. Hence the high yields of desirable $C_3$+hydrocarbons would be of no avail, since they could not long be maintained.

Run 2, on the other hand, is representative of good operation. In this case, the actual $CO_2$ yield conforms quite closely to that required in accordance with the present invention, and it will be noted that this has resulted in a good yield of the desirable $C_3$+hydrocarbons, and, at the same time, a sufficiently low yield of carbon so that synthesis operations can be maintained indefinitely.

Run 3 is representative of poor operation on the other side of the scale wherein the actual $CO_2$ yield is higher than that called for by the present invention. Although the carbon yield is sufficiently low so that protracted synthesis operation could be conducted without difficulty it will be noted that the yield of desirable $C_3$+hydrocarbons is quite low, indicating that the operation is wasteful of available carbon in the synthesis gas feed by discarding it as relatively useless $CO_2$, and simultaneously impairing production of the desirable $C_3$+hydrocarbons.

Run 4 represents good operation with a synthesis gas feed which was originally relatively deficient in hydrogen, as indicated by the low value of R. Here it will be noted that the actual $CO_2$ yield closely approaches the $CO_2$ yield required in the practice of my invention. In consequence, carbon yield is low, and while the yield of desirable $C_3$+hydrocarbons is also low in comparison with the previous examples of good operation, it is excellent when considering the comparative hydrogen deficiency of the feed available for the synthesis.

Run 5 is similar to Example 4, in that it represents good operation with a synthesis gas feed even more deficient in hydrogen than that shown in Run 4.

From the foregoing, it is apparent that the invention contemplates adjusting the net carbon dioxide production to a value approximating the value of K, by an equation applicable over ranges of R from as low as about 0.8 to as high as about 2.2.

The term "approximate," and "approximating," as applied to the value of K contemplates a range of variation of not more than about two units from the calculated value of K. While reference has been had, above, to fluid bed operation, the invention is not so limited but in its broadest aspect includes contact with the catalyst in the form of a fixed or moving bed, or any other conventional variations. The invention is particularly effective where the value of S is in the range above 75 per cent.

Obviously, many modifications and variations of the invention as above set forth may be made without departing from the spirit and scope thereof, and therefore only such limitations should be imposed as are indicated in the appended claims.

What I claim is:

1. In the synthesis of organic compounds of the class consisting of hydrocarbons and oxygenated hydrocarbons wherein synthesis gas comprising hydrogen and carbon monoxide in a molar ratio in the range of about 0.8:1 to 2.2:1 is passed in contact with a solid particle iron-containing synthesis catalyst at a superatmospheric pressure and at an elevated temperature in the range of about 550–750° F. to form predominantly liquid organic compounds together with accompanying normally gaseous organic compounds and by-product carbon dioxide and water vapor, said iron-containing catalyst having a predetermined characteristic selectivity for the production of said liquid organic compounds expressed as the ratio of the net production of hydrocarbons containing three or more carbon atoms plus all of the oxygenated hydrocarbons to the total net production of hydrocarbons and oxygenated hydrocarbons, the improvement which comprises maximizing the production of said liquid organic compounds by maintaining carbon dioxide-forming conditions of the reaction such that carbon dioxide is produced at a predetermined rate, which, expressed as the percentage of the carbon monoxide consumed in the reaction, does not deviate from $9-33R-0.2S$ by more than about 9%, where R is the aforesaid molar ratio of hydrogen to carbon monoxide in the synthesis gas and S is the selectivity of the catalyst.

2. The method according to claim 1, wherein at least about 95 per cent of the net feed carbon monoxide is consumed.

3. The method according to claim 1, wherein the value of S is in excess of about 75 per cent.

JOHN H. ARNOLD.

REFERENCES CITED

The following references are of record in the file of this patent:

UNITED STATES PATENTS

| Number | Name | Date |
|---|---|---|
| 2,207,581 | Duftschmid et al. | July 9, 1940 |
| 2,244,196 | Herbert | June 3, 1941 |
| 2,248,099 | Linckh et al. | July 8, 1941 |
| 2,271,259 | Herbert | Jan. 27, 1942 |
| 2,279,052 | Michael et al. | Apr. 7, 1942 |
| 2,286,814 | Kemp | June 16, 1942 |
| 2,486,895 | Watson | Nov. 1, 1949 |
| 2,510,096 | Frankenburg | June 6, 1950 |